(12) United States Patent
Su et al.

(10) Patent No.: US 11,874,429 B2
(45) Date of Patent: Jan. 16, 2024

(54) HIGH-TEMPERATURE DISASTER FORECAST METHOD BASED ON DIRECTED GRAPH NEURAL NETWORK

(71) Applicant: Nanjing University of Information Science & Technology, Nanjing (CN)

(72) Inventors: Buda Su, Beijing (CN); Guojie Wang, Nanjing (CN); Zicong Luo, Nanjing (CN); Tong Jiang, Nanjing (CN); Yanjun Wang, Nanjing (CN); Guofu Wang, Beijing (CN); Aiqing Feng, Beijing (CN)

(73) Assignee: Nanjing University of Information Science & Technology, Nanjing (CN)

( * ) Notice: Subject to any disclaimer, the term of this patent is extended or adjusted under 35 U.S.C. 154(b) by 0 days.

(21) Appl. No.: 18/130,561

(22) Filed: Apr. 4, 2023

(65) Prior Publication Data
US 2023/0375745 A1 Nov. 23, 2023

(30) Foreign Application Priority Data
May 17, 2022 (CN) .......................... 2022105321126

(51) Int. Cl.
*G01W 1/10* (2006.01)
*G06N 3/044* (2023.01)

(52) U.S. Cl.
CPC .............. *G01W 1/10* (2013.01); *G06N 3/044* (2023.01)

(58) Field of Classification Search
CPC .................................. G01W 1/10; G06N 3/044
See application file for complete search history.

(56) References Cited

U.S. PATENT DOCUMENTS

2020/0065213 A1* 2/2020 Poghosyan ............ G06N 3/044
2020/0348448 A1* 11/2020 Tocornal ............... G06N 3/044
(Continued)

FOREIGN PATENT DOCUMENTS

CN           111815037 A   * 10/2020   .............. G01W 1/10

OTHER PUBLICATIONS

Zonghan Wu et al., "Connecting the Dots: Multivariate Time Series Forecasting with Graph Neural Networks", "arXiv: 2005.11650v1", Aug. 23-27, 2020, pp. 1-11.
(Continued)

*Primary Examiner* — Yoshihisa Ishizuka
(74) *Attorney, Agent, or Firm* — Zhigang Ma (57) ABSTRACT

A high-temperature disaster forecast method based on a directed graph neural network is provided, and the method includes the following steps: S1, performing standardization processing on meteorological elements respectively to scale the meteorological elements into a same value range; S2, taking the meteorological elements as nodes in the graph, and describing relationships among the nodes by an adjacency matrix of graph; then learning node information by a stepwise learning strategy and continuously updating a state of the adjacency matrix; S3, training the directed graph neural network model after determining a loss function, obtaining a model satisfying requirements by adjusting a learning rate, an optimizer and regularization parameters as a forecast model, and saving the forecast model; and S4, inputting historical multivariable time series into the forecast model, changing an output stride according to demands, and thereby obtaining high-temperature disaster forecast for a future period of time.

5 Claims, 3 Drawing Sheets

(56) References Cited

U.S. PATENT DOCUMENTS

2022/0180179 A1* 6/2022 Gusat .................. G06N 3/08
2022/0214322 A1* 7/2022 Song .................. G01N 33/0034
2022/0327433 A1* 10/2022 Cook .................. G06N 20/20

OTHER PUBLICATIONS

Wang Danni et al., "Agricultural high temperature disaster monitoring based on meteorological data mining in Guangdong Province", "Journal of South China Agricultural University", 2015, vol. 36, Issue 2, pp. 106-112.
CNIPA, Notification of a First Office Action for CN202210532112.6, Jul. 21, 2022.
Nanjing university of information science and technology (Applicant), Reply to Notification of a First Office Action for CN202210532112.6, w/ replacement claims, dated Jul. 26, 2022.
Nanjing university of information science and technology (Applicant), Supplemental Reply to Notification of a First Office Action for CN202210532112.6, w/ (allowed) replacement claims, dated Aug. 1, 2022.
CNIPA, Notification to grant patent right for invention in CN202210532112.6, dated Aug. 12, 2022.

* cited by examiner

HIGH-TEMPERATURE DISASTER FORECAST METHOD BASED ON DIRECTED GRAPH NEURAL NETWORK

TECHNICAL FIELD

The disclosure relates to short-term meteorological forecast methods, and particularly to a high-temperature disaster forecast method based on a directed graph neural network (DGNN).

BACKGROUND

The climate is ever-changing and a change process thereof is extremely complex. Climate anomalies may lead to drought, floods, typhoons and other natural disasters, seriously affecting human social activities. With the development of society, many meteorology-related industries have put forward higher requirements for the accuracy and timeliness of meteorological forecast. Researches of meteorological forecast are mainly carried out based on two methods, namely, physics-based calculation and data-driven. For the physic-based calculation, a physics-based meteorological forecast model usually relies on large-scale numerical simulation, and simulates a physical process in the atmosphere based on observation data. A data-driven model uses a traditional statistical method or a deep learning-based method to complete a meteorological forecast. An inherent uncertainty of physical parameterization or an incomplete understanding of the physical process is a main scientific challenge for the future development of numerical weather prediction. The traditional statistical method such as autoregressive integrated moving average model (ARIMA) is mainly effective for stationary time series, and can only capture linear relationships among variables. Early machine learning models such as shallow neural networks are limited by limited sample sizes and computational units, and they are limited to express complex functions, and they are also limited to generalize complex problems.

A high-temperature disaster usually refers to a meteorological disaster that causes discomfort and adverse effects to living and non-living bodies such as humans, animals, plants and inorganic environment due to a long duration of high-temperature. Objective analysis of urban high-temperature environment, accurate identification of disaster causing factors of high-temperature disasters, and scientific forecast and evaluation of risks of high-temperature disasters are premises to actively respond to urban high temperatures in urban planning, and are also basic works for integrating high-temperature disaster response strategies into a territorial spatial planning system. The disaster causing factors of high-temperature disasters are mainly meteorological factors such as temperature, humidity, wind speed, etc. However, due to the uncertainty of correlations among the meteorological factors and characteristics of rapid change of the factors in a short time, it is difficult to simulate change processes and interaction of the disaster causing factors with the traditional statistical models.

Weather forecast itself is a big data research topic, involving massive data in different time and space, and is a suitable application scenario of deep learning. Compared with a numerical weather prediction (NWP) model based on a physical process, deep learning methods automatically extract internal features of data, thereby eliminating the dependence on human experience in traditional feature engineering methods. Moreover, these deep learning methods have more powerful feature extraction abilities than the traditional methods on time series and spatial grid data, and a method of modeling time series in a pure data-driven manner is provided. In the past few years, In the past few years, the rise of neural networks has promoted the cooperation between deep learning and various disciplines. A recurrent neural network (RNN) was first proposed to deal with a nonlinear recursion problem in time series. Most variants of the recurrent neural network such as long short-term memory (LSTM) and gated recurrent unit (GRU) showed better performance in time series forecast than traditional statistical forecast methods. However, the meteorological elements interact with each other, and the change of one of the elements will lead to the change of the other elements and even the whole environmental state. The traditional deep learning networks have the following problems in dealing with multivariate time series: (1) they only assumed that there are relationships among variables, and it is difficult to simulate how the change of one of the variables interacts with the other variables; (2) the performance of the traditional deep learning networks in processing long time series is poor, and the complexity of the model increases quadratically as the increasing of amount of data, thereby resulting in overfittings of models.

SUMMARY

A purpose of the disclosure is to provide a method that can realize an intelligent forecast of a high-temperature disaster in a future short term by using a directed graph neural network to reflect driving relationships among variables.

A technical solution of the disclosure is related to a high-temperature disaster forecast method including the following steps:

step S1: performing standardization processing on meteorological elements respectively to scale the meteorological elements into a same value range; according to high-temperature early warning levels, setting high-temperature disaster values to be 0, 1, 2 and 3 respectively representing no high-temperature disaster, a high-temperature yellow early warning, a high-temperature orange early warning and a high-temperature red early warning; and encoding the high-temperature disaster values introducing a model into a discrete value vector (y1, y2, y3, y4) added into input data as a label, thereby to complete data reconstruction;

according to time periodic characteristics of the meteorological elements, constructing the meteorological elements after being performed with the standardization processing into a multidimensional time series sample set based on a sliding window method; and according to a setting ratio, dividing the multidimensional time series sample set into a training set, a verification set and a testing set;

step S2: constructing a directed graph neural network model;

step S3: training the directed graph neural network model after determining a loss function, obtaining a model satisfying requirements by adjusting a learning rate, an optimizer and regularization parameters as a forecast model, and saving the forecast model; and step S4: inputting historical multivariable time series into the forecast model, changing an output stride according to demands, and thereby obtaining high-temperature disaster forecast for a future period of time.

In an embodiment, in the step S1, the meteorological elements include daily maximum temperature, precipitation, wind speed, air humidity, sunshine hours, and evapotranspiration; and a process of constructing the multidimensional time series sample set according to the time periodic characteristics of the meteorological elements includes:

setting $z_t \in R$, which represents values of multivariate variables at a time stride t, where R represents a real number; wherein $z_t[i] \in R$ represents a value of a variable i at the time stride t, and a historical sequence of multivariate data at a given time length of p is as follows:

$$X=\{z_{t_1}[i], z_{t_2}[i], \ldots, z_{t_p}[i]\};$$

where a label set is as follows:

$$Y=\{(y_{t1_1}, y_{t1_2}, y_{t1_3}, y_{t1_4}), (y_{t2_1}, y_{t2_2}, y_{t2_3}, y_{t2_4}), \ldots, (y_{tp_1}, y_{tp_2}, y_{tp_3}, y_{tp_4})\};$$

where, $y_{tg_1}$, $y_{tg_2}$, $y_{tg_3}$, $y_{tg_4}$ respectively represent a probability of the no high-temperature disaster, a probability of the high-temperature yellow early warning, a probability of the high-temperature orange early warning and a probability of the high-temperature red early warning at a time g; and g=1, 2, 3, . . . , p.

In an embodiment, in the step S2, mutual driving relationships among variables are need to be built in the directed graph neural network model based on a graph, the meteorological elements are taken as nodes in the graph, and relationships among the nodes are described by an adjacency matrix of graph; then node information is learned by a stepwise learning strategy to continuously update a state of the adjacency matrix; the stepwise learning strategy includes: a graph learning layer, starting from an initial state, adding a node to the graph during each time of learning, then using a recurrent neural network to calculate, based on autoregressive of node information, a similarity score, and generating a connection relationship between the node as added and each original node;

the recurrent neural network processing initial information of node and decoding a representation vector of node into a hidden state as input of a next iteration, wherein node information is continuously aggregated during an iteration process, and the iteration process is as follows:

$$M_1 = \tan h(\alpha E_1 \Theta_1);$$

$$M_2 = \tan h(\alpha E_2 \Theta_2);$$

$$A = (\tan h(\alpha(M_1 M_2^T + M_2 M_1^T)));$$

$$H_t = \text{sigmod}(W \cdot x_t + U \cdot H_{t-1});$$

where, W and U are hyperparameters, $x_t$ represents current input time series data; an expression of sigmoid function is $$sigmod(x) = \frac{1}{1+e^{-x}},$$

and e represents a base of a natural logarithmic function; E1 and E2 represent randomly initialized node embeddings; $\Theta_1$ and $\Theta_2$ represent neural network model parameters; a represents a hyperparameter that controls a saturation rate of an activation function and is learned in a training process; A represents an adjacency matrix obtained after information aggregation based on nodes; $H_{t-1}$ represents an output hidden state of a previous iteration, and $H_t$ represents a hidden state, namely the representation vector of node, of current iteration; and continuously updating a composition of the graph by aggregating the node information, and thereby obtaining a global adjacency matrix of graph.

In an embodiment, in the step S2, the directed graph neural network model is constructed according to the time periodic characteristics of meteorological data, interactions among energy cycle, water cycle and the meteorological elements. The directed graph neural network model aggregates information of input data through a graph convolutional module and a temporal convolutional module, including:

a graph learning module adaptively extracting an adjacency matrix of graph from input time series data according to the stepwise learning strategy as input of subsequent node information aggregating process of the graph convolution module; where a sampling method only calculates the similarity score between pairs of nodes each time, and the similarity score between the pairs of nodes is taken as a hidden state and aggregated in each calculation process to obtain the global adjacency matrix of graph;

where the graph convolutional module is composed of two mixed propagation layers respectively processing inflow information and outflow information of each node, each of the two mixed propagation layers comprises an information propagation process and an information selection process, the information propagation process is configured to transmit node information based on a graph structure given by the adjacency matrix of graph, and the information selection process is configured to filter noise generated in the information propagation process;

where an attention mechanism is added in the information propagation process by that edges connecting nodes in the adjacency matrix of graph are given different weights according to a formula as follows:

$$H_t = \beta H_{t-1};$$

where β represents the weight of each of the edges; $H_{t-1}$ represents the output hidden state of the previous iteration; $H_t$ represents the hidden state, namely the representation vector of node, of the current iteration.

In an embodiment, the temporal convolutional module includes four convolution kernels of different sizes and configured to extract time characteristics of data; in a process of extracting the time characteristics of data, a receptive field is controlled by setting sizes of the four convolution kernels; and a calculation formula of the receptive field is as follows:

$$rfsize = (out-1)*stride + ksize;$$

where out represents a size of receptive field of an upper layer; stride represents a moving stride of receptive field of current layer and has a default value of 1; and ksize represents a size of convolution kernel of the current layer.

In an embodiment, in the step S3, a cross entropy loss function is chosen as the loss function and an expression thereof is as follows:

$$l = \frac{1}{m}\sum_{k=1}^{m} G(y^{(k)}, y'^{(k)});$$

$$G(y^{(k)}, y'^{(k)}) = -\sum_{J=1}^{p} y^{(k)} \log y'^{(k)};$$

where m represents a total amount of data, p represents a classification number, k represents current input data, $y'^{(k)}$ represents a forecasted value, and $y^{(k)}$ represents an actual value.

Compared with the prior art, embodiments of the disclosure may have the following advantages:
1. a high-temperature disaster forecast method based on a directed graph neural network is provided by simulating mutual driving relationships among variables based on a graph;
2. since interactions among meteorological elements are different, at least one embodiment of the disclosure adds an attention mechanism to the directed graph neural network model, which can make the model focus more on the part that has a large impact on variables and thus is more beneficial to the aggregation of effective information;
3. at least one embodiment of the disclosure provides a convolution kernel combination that can capture various time periodic modes and thereby can make the model be capable of processing long time series; and
4. in considering of interactions between energy cycle and water cycle, in combination with daily maximum temperature, rainfall, wind speed, air humidity, sunshine hours, and evapotranspiration that interact with each other in a same scale range, the directed graph neural network model is used to reflect the mutual driving relationships among the variables and make accurate forecast of high-temperature disaster in a future short term, thereby scientifically forecasting and evaluating risks of high-temperature disasters, providing strong support for decision-makings of meteorological departments, and providing reference for people's daily activities.

DETAILED DESCRIPTION OF EMBODIMENTS

The disclosure is further described in detail below in combination with the drawings and specific embodiments of the specification.

In the disclosure, a directed graph neural network is used to build a directed network to show directed driving relationships among meteorological elements including daily maximum temperature, precipitation, wind speed, air humidity, sunshine hours, and evapotranspiration, and finally the intelligent and accurate forecast of high-temperature disasters is realized. The directed graph neural network uses a graph structure to treat variables (i.e., the meteorological elements) as nodes in a graph. Each of the nodes will have edges related to other nodes in the graph. The forecast method of the disclosure relies on a mathematical representation (i.e., an adjacency matrix of graph) of hidden relationships among the nodes, follows a neighborhood aggregation strategy, and iteratively updates the representation of the nodes according to the neighborhood information of aggregated nodes. The forecast method of the disclosure can not only capture interdependent relationships among the variables, but also capture time modes by improving a one-dimensional convolution form, thereby to process long time series.

Figure 1:
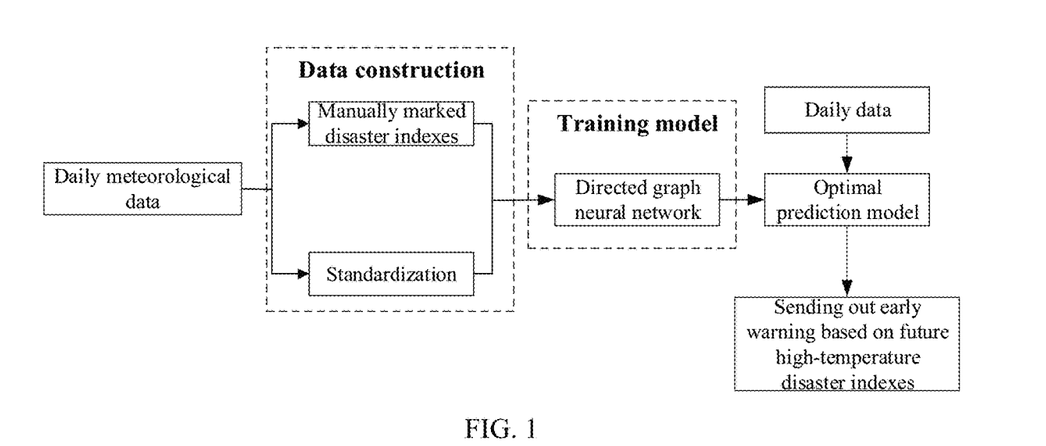
FIG. 1 illustrates a general framework of an embodiment of the disclosure.

A general framework of an embodiment of the disclosure is shown in FIG. 1. The embodiment of the disclosure includes:
(1) preprocessing multivariable meteorological data;
(2) building a directed graph neural network;
(3) determining a loss function and training the network; and
(4) performing high-temperature disaster forecast based on a deep learning method.

A specific implementation process of the embodiment of the disclosure may include the following steps:

Step (1): Preprocessing Multivariable Meteorological Data

A deep learning model needs a large number of training samples to pre-train the model. The time series forecast is a forecast of future based on the analysis of historical data. Therefore, historical time series containing multiple meteorological elements are needed to pre-train the model and verify the performance of the model.

(1.1) Data Standardization

Since measurement units and value ranges of various meteorological elements (such as daily maximum temperature, precipitation, wind speed, air humidity, solar radiation, evapotranspiration, surface net radiation, etc.) are different in original data, there may be a large difference between the maximum and minimum values in a same meteorological element. For example, a value range of the surface net radiation is in a range of $0$-$10^7$, which will cause a large difference in a distribution range of the characteristic value when introducing the model, this will affect the convergence speed and accuracy of the model. Therefore, it is necessary to standardize the original data so that the value range of each variable is in a range of −1 to 1.

(1.2) Data Reconstruction

The high-temperature early warning signal is divided into three levels as a kind of sudden meteorological disaster early warning signal, the three levels are represented by yellow, orange, and red respectively, and the high-temperature early warning signal is divided according to the thresholds of high-temperature levels specified by each administrative area. Firstly, the high-temperature disaster indexes are marked manually in historical time series, that is, a column of high-temperature disaster indexes is added according to the daily maximum temperature value in the input data. 0, 1, 2 and 3 are respectively represented no high-temperature disaster, a high-temperature yellow early warning, a high-temperature orange early warning and a high-temperature red early warning.

Figure 2:
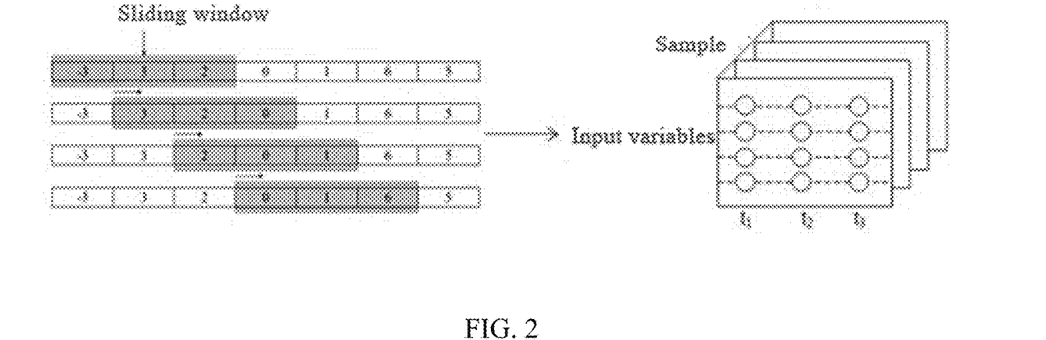
FIG. 2 is a schematic diagram of setting a sliding window and a process of transforming to a form of input data according to an embodiment of the disclosure.

(1.3) Constructing a Multidimensional Time Series Sample Set Based on a Sliding Window Method The purpose of analysis on time series is to find out the statistical characteristics and development regularity of the time series in samples, and a time series model is constructed based on the regularity, thereby to forecast the sample. Many meteorological elements have periodic characteristics, such as the maximum daily temperature follows a monthly or seasonal period. Therefore, the sliding window method can be used to construct time series after the standardization of each value of the meteorological elements, as shown in FIG. 2. The sliding window size can be 30, 60 or 90, and each moving stride of the sliding window is 1.

Setting $z_t \in R$, which represents values of multivariate variables at a time stride t, where R represents a real number; where $z_t[i] \in R$ represents a value of a variable i at the time stride t, and a historical sequence of multivariate data at a given time length of p is as follows:

$$X=\{z_{t_1}[i], z_{t_2}[i], \ldots, z_{t_p}[i]\} \quad (1).$$

The daily high temperature disaster indexes will be coded as a discrete value vector $(y_{tg_1}, y_{tg_2}, y_{tg_3}, y_{tg_4})$ after introducing the model, these four values respectively represent a probability of the no high-temperature disaster, a probability of the high-temperature yellow early warning, a probability of the high-temperature orange early warning and a probability of the high-temperature red early warning at a time g. For example, when the daily maximum temperature is 41.6° C., the discrete value vector is (0, 0, 0, 1), g=1, 2, 3, ..., p. Therefore, the high-temperature disaster indexes can be represented as the multidimensional time series sample set (also referred to as a label set or a data set):

$$Y=\{(y_{t1_1}, y_{t1_2}, y_{t1_3}, y_{t1_4}), (y_{t2_1}, y_{t2_2}, y_{t2_3}, y_{t2_4}), \ldots, (y_{tp_1}, y_{tp_2}, y_{tp_3}, y_{tp_4})\} \quad (2).$$

(1.4) Dividing the Data Set

The multidimensional time series sample set is divided into a training set, a verification set and a testing set according to a certain proportion (usually 7:1:2). The training set and verification set participate in a training process of the model together, and the testing set is used to test the effect of the model after the training process.

Step (2): Building a Directed Graph Neural Network

In the disclosure, the directed graph neural network treats daily maximum temperature, precipitation, wind speed, air humidity, sunshine hours, and evapotranspiration as the nodes in the graph by using a graph structure. Each of the nodes will have edges related to other nodes in the graph. Then the forecast method of the disclosure relies on a mathematical representation (i.e., an adjacency matrix of graph) of hidden relationships among the nodes and follows a neighborhood aggregation strategy, and iteratively updates the representation of the nodes according to the neighborhood information of aggregated nodes. The forecast method of the disclosure can also capture time modes by improving a one-dimensional convolution form, thereby to process long time series. A network output layer is composed of four neurons which map four discrete values respectively representing a probability of the no high-temperature disaster, a probability of the high-temperature yellow early warning, a probability of the high-temperature orange early warning and a probability of the high-temperature red early warning.

The graph describes the relationships between variables in the model, and definitions of relevant concepts of the graph is as follows:

Definition 1: Graph

A formula of representing the graph:

$$G=(V,E) \quad (3)$$

where V is a node set and E is an edge set (the edge set is used to represent the relationships among nodes).

Definition 2: Neighborhood Node $v \in V$ represents a node, $e=(v, u) \in E$ represents an edge from node u to node v, then the adjacent node with node v is defined as:

$$N(v)=\{u \in V | (v,u) \in E\} \quad (4).$$

Definition 3: Adjacency Matrix

The adjacency matrix is a mathematical representation of the graph, expressed as $A \in R^{N \times N}$. N represents an amount of the nodes in the graph.

Figure 3A:
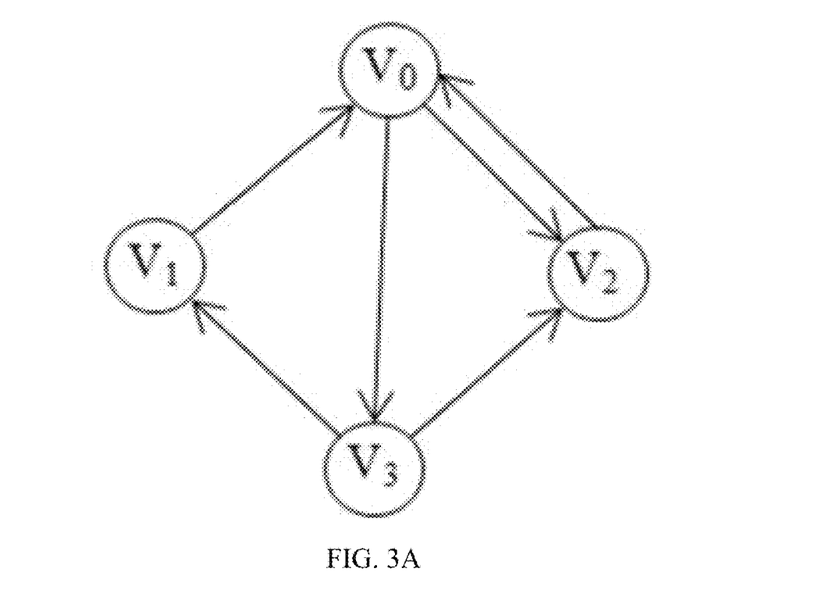
FIG. 3A illustrates an example of a "graph" according to an embodiment of the disclosure.
Figure 3B:
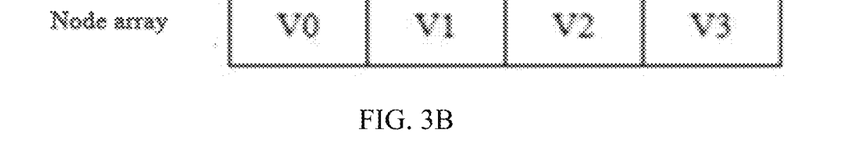
FIG. 3B illustrates an example of nodes corresponding to FIG. 3A.
Figure 3C:
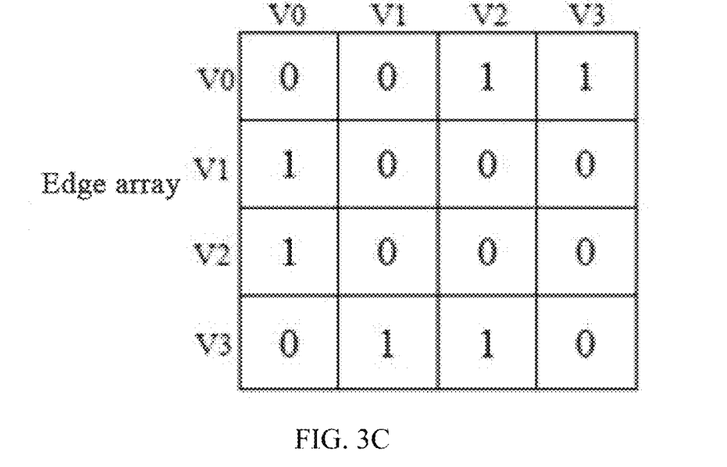
FIG. 3C illustrates an example of an adjacency matrix of graph corresponding to FIG. 3A.

An example of an adjacency matrix of graph is given in FIGS: FIG. 3A illustrates an example of a "graph", FIG. 3B illustrates an example of nodes corresponding to FIG. 3A, and FIG. 3C illustrates an example of an adjacency matrix of graph corresponding to FIG. 3A. Where, 1 and 0 respectively indicate whether there is a hidden relationship between two adjacent nodes. As shown in FIG. 3C, the adjacency matrix can indicate the unidirectional or bidirectional relationship between variables. The adjacency matrix provides a direction of information transmission for a convolution process of the graph as an external structure input.

Based on the definitions about the graph, the disclosure treats the daily maximum temperature, precipitation, wind speed, air humidity, sunshine hours, and evapotranspiration as nodes in the graph. The adjacency matrix of graph is used to describe relationships among the nodes, and a graph learning layer is used to learn the adjacency matrix.

Figure 4:
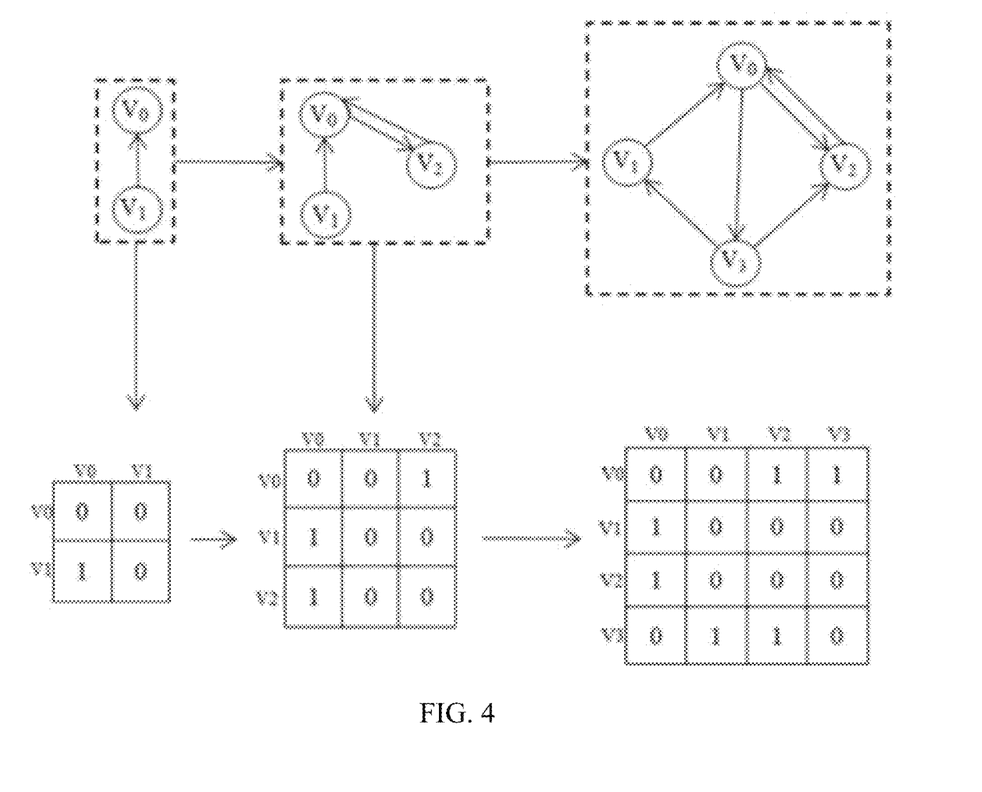
FIG. 4 illustrates a learning process of an adjacency matrix of graph according to an embodiment of the disclosure.

The disclosure provides a stepwise learning strategy: the graph learning layer starting from an initial state adds a node to the graph during each time of learning, then a recurrent neural network is used to calculate a similarity score based on autoregressive of node information, a similarity score, thereby to generate a connection relationship between the node as added and each original node, as shown in FIG. 4.

The recurrent neural network processes initial information of node and decodes a representation vector of node into a hidden state as input of a next iteration (the calculation process represented by formula (8)), node information is continuously aggregated during an iteration process, and the iteration process is as follows:

$$M_1 = \tan h(\alpha E_1 \Theta_1) \quad (5)$$

$$M_2 = \tan h(\alpha E_2 \Theta_2) \quad (6)$$

$$A = (\tan h(\alpha (M_1 M_2^T + M_2 M_1^T))) \quad (7)$$

$$H_t = \text{sigmod}(W \cdot x_t + U \cdot H_{t-1}) \quad (8)$$

where, W and U are hyperparameters, $x_t$ represents current input time series data; an expression of sigmoid function is $$sigmod(x) = \frac{1}{1+e^{-x}},$$

and e represents a base of a natural logarithmic function; E1 and E2 represent randomly initialized node embeddings; $\Theta_1$ and $\Theta_2$ represent neural network model parameters; a represents a hyperparameter that controls a saturation rate of an activation function and is learned in a training process; A represents an adjacency matrix obtained after information aggregation based on nodes; $H_{t-1}$ represents an output hidden state of a previous iteration, and $H_t$ represents a hidden state of current iteration, namely the representation vector of node.

A graph learning module adaptively extracts an adjacency matrix of graph from input time series data completely according to the stepwise learning strategy as input of subsequent node information aggregating process of the graph convolution module. The disclosure uses a sampling method that only calculates the similarity score between pairs of nodes each time, and the similarity score between the pairs of nodes is taken as a hidden state and aggregated in each calculation process to obtain the global adjacency matrix of graph. The sampling method enables the directed graph neural network model to continuously update the adjacency matrix with the update of the input data, which has stronger generalization.

The graph convolutional module is composed of two mixed propagation layers respectively configured to process inflow information and outflow information of each node, each of the two mixed propagation layers includes an information propagation process and an information selection process, the information propagation process is configured to transmit node information based on a graph structure given by the adjacency matrix of graph, and the information selection process is configured to filter noise generated in the information propagation process.

Figure 5:
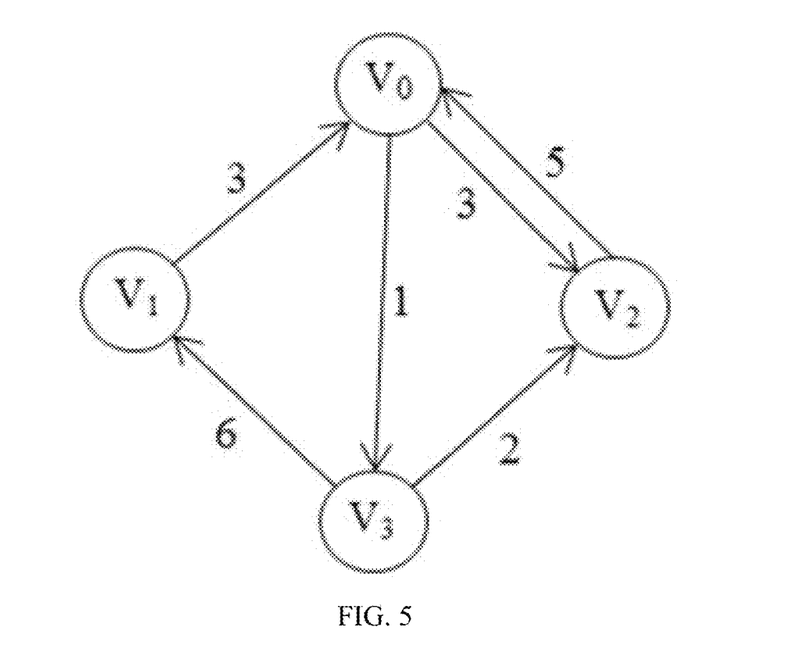
FIG. 5 illustrates an attention mechanism according to an embodiment of the disclosure.

Since the interactions among the meteorological elements are different, for example, the fundamental source of atmospheric heat is solar radiation, and solar radiation in the same area should account for a greater proportion than other factors affecting atmospheric temperature. Therefore, the embodiment of the disclosure adds an attention mechanism in the information propagation process, that is, edges connecting nodes in the adjacency matrix of graph are given different weights, as shown in FIG. 5, a formula of the attention mechanism is as follows:

$$H_t = \beta H_{t-1} \tag{9}$$

where $\beta$ represents the weight of each of the edges; $H_{t-1}$ represents the output hidden state of the previous iteration; $H_t$ represents the hidden state of the current iteration, namely the representation vector of node.

The addition of the attention mechanism is conducive to eliminating the negative impact of the noise on the directed graph neural network model, avoiding the problem of excessive smoothing, and is also conducive to releasing the memory occupied by the model and concentrating the computing power on a more important part.

Figure 6:
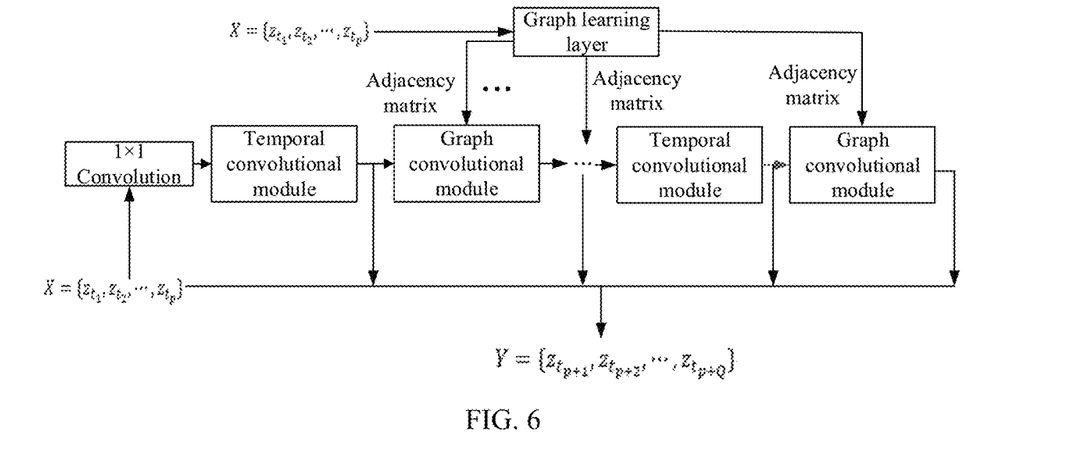
FIG. 6 illustrates a schematic diagram of a framework of a directed graph neural network according to an embodiment of the disclosure.

Due to the meteorological elements have different time period characteristics in the disclosure. In order to make the directed graph neural network model not affected by these different time periodic characteristics, the disclosure adds a temporal convolutional module composed of four convolution kernels of different sizes to the directed graph neural network model to enable the directed graph neural network model to capture different periodic signals, as shown in FIG. 6. The temporal convolutional module is configured to extract time characteristics of data. In a process of extracting the time characteristics of data, a receptive field is controlled by setting sizes of the four convolution kernels. Since time signals often have several inherent periods, such as 7, 12, 24, 28 and 60. The convolution kernel cannot capture short-term time characteristics if the convolution kernel is too large while the convolution kernel cannot capture long-term time characteristics if the convolution kernel is too small. In order to capture the periodic characteristics of various ranges and improve the ability of the directed neural network model to process long time series, the directed graph neural network model combines four convolution kernels of different sizes (1*2, 1*3, 1*6 and 1*7) to form a temporal convolutional module. A calculation formula of the receptive field is as follows:

$$rfsize = (out-1)*stride + ksize \tag{10}$$

where out represents a size of receptive field of an upper layer; stride represents a moving stride of receptive field of current layer and has a default value of 1; and ksize represents a size of convolution kernel of the current layer. For example, in order to represent a period of 12, the directed graph neural network model transmits the input by setting the convolution kernel of 1*7 in a first layer and 1*6 in a second layer.

The temporal convolutional module is followed by four output neurons, each of the output neurons maps a discrete value, and then a forecast vector $(y'_1, y'_2, y'_3, y'_4)$ is obtained corresponding to the manually marked high-temperature disaster index vector. The linear relationship between each discrete value and input variables is as follows:

$$y'_1 = x_1 w_{11} + x_2 w_{21} + x_3 w_{31} + \ldots + x_i w_{i1} + b_1 \tag{11}$$

$$y'_2 = w_1 w_{12} + x_2 w_{22} + x_3 w_{32} + \ldots + x_i w_{i2} + b_2 \tag{12}$$

$$y'_3 = x_1 w_{13} + x_2 w_{23} + x_3 w_{33} + \ldots + x_i w_{i3} + b_3 \tag{13}$$

$$y'_4 = x_1 w_{14} + x_2 w_{24} + x_3 w_{34} + \ldots + x_i w_{i4} + b_4 \tag{14}$$

where $x_i$ represents an i-th input variable, $w_{ij}$ and $b_j$ are model parameters, j=1,2,3,4, and the linear relationship is learned by the model independently during training.

Then an operator soft max is used to change the forecast vector to a probability distribution that output values are positive numbers and the sum of the output values is 1 by the following formula (15).

$$y'_1, y'_2, y'_3, y'_4 = \text{soft max}(y'_1, y'_2, y'_3, y'_4) \tag{15}$$

$$\text{soft max}(y'_j) = \frac{e^{y'_j}}{\sum_{j=1}^{4} e^{y'_j}} \tag{16}$$

where j=1,2,3,4. After the operation of soft max, since the output values are in a range of [0, 1], each of the output values can be given a practical meaning, that is, a probability belonging to a certain classification. Therefore, $y'_1$, $y'_2$, $y'_3$, $y'_4$ form a probability distribution, and the classification corresponding to the maximum probability as an output classification. For example, if the probability distribution is (0.1, 0.84, 0.06, 0), then the output value is the disaster index 1 corresponding to the high-temperature yellow early warning.

Step 3: Determining a Loss Function and Training the Network

The data of the training set and verification set data processed in the step 1 are input into the directed graph neural network model built in the step 2 for training. According to the performance of the directed graph neural network model, the parameters of the directed graph neural network model are adjusted, such as a learning rate, an optimizer, regularization parameters, etc., so that the directed graph neural network model can achieve the desired effect. A directed graph neural network model with the optimal effect obtained by multiple trainings is taken as the forecast model.

Since there is no observation data for verification of future forecast values, both the training model and the verification model use historical time series data in a forecast task of time series. In a training process, the loss function is usually used as a learning criterion to evaluate the degree of the difference between the forecast vector of the model and the real value vector. The purpose of training the model is generally achieved through a cross entropy loss function. Specific formulas are as follows:

$$l = \frac{1}{m}\sum_{k=1}^{m} G(y_{(k)}, y'_{(k)}) \quad (17)$$

$$G(y_{(k)}, y'_{(k)}) = -\sum_{k=1}^{p} y_{(k)} \log y'_{(k)} \quad (18)$$

where m represents a total amount of data, p represents a classification number and p is equal to 4 herein, k represents current input data, $y'^{(k)}$ represents a forecasted value, and $y^{(k)}$ represents an actual value.

After the loss function is determined, the directed graph neural network model is trained. During the training process, it is necessary to observe whether the loss function curve of the loss function gradually decreases and finally becomes stable. If the decline speed of the loss function curve is slow or the loss function curve fluctuates violently during the training process, the model parameters such as learning rate and batch size can be adjusted appropriately. After the loss function curve decreases to the lowest and tends to be stable, the optimal model is obtained and saved as the forecast model.

Step 4: Performing High-Temperature Disaster Forecast Based on a Deep Learning Method A multivariable time series is input into the forecast model, and then the output stride is changed according to the demand to obtain the high-temperature disaster index series for a period of time, and a corresponding high-temperature disaster early warning is issued out.

What is claimed is:

1. A high-temperature disaster forecast method based on a directed graph neural network, comprising:

step S1: performing standardization processing on meteorological elements respectively to scale the meteorological elements into a same value range; according to high-temperature early warning levels, setting high-temperature disaster values to be 0, 1, 2 and 3 respectively representing no high-temperature disaster, a high-temperature yellow early warning, a high-temperature orange early warning and a high-temperature red early warning; and encoding the high-temperature disaster values introducing a model into a discrete value vector $(y_1, y_2, y_3, y_4)$ added into input data as a label;

constructing, according to time periodic characteristics of the meteorological elements, the meteorological elements obtained after performing the standardization processing into a multidimensional time series sample set based on a sliding window method; and according to a setting ratio, dividing the multidimensional time series sample set into a training set, a verification set and a testing set;

step S2: constructing a directed graph neural network model, wherein a process of constructing the directed graph neural network model comprises:

for the directed graph neural network model, building mutual driving relationships among variables based on a graph, taking the meteorological elements as nodes in the graph, and describing relationships among the nodes by an adjacency matrix of graph; then learning node information by a stepwise learning strategy and continuously updating a state of the adjacency matrix; wherein the stepwise learning strategy comprises: a graph learning layer, starting from an initial state, adding a node to the graph during each time of learning, then using a recurrent neural network to calculate, based on autoregressive of node information, a similarity score, and generating a connection relationship between the node as added and each original node;

the recurrent neural network processing initial information of node and decoding a representation vector of node into a hidden state as input of a next iteration, wherein node information is continuously aggregated during an iteration process, and the iteration process is as follows:

$$M_1 = \tan h(\alpha E_1 \Theta_1);$$

$$M_2 = \tan h(\alpha E_2 \Theta_2);$$

$$A = (\tan h(\alpha(M_1 M_2^T + M_2 M_1^T)));$$

$$H_t = \text{sigmod}(W \cdot x_t + U \cdot H_{t-1});$$

where, W and U are hyperparameters, $x_t$ represents current input time series data; an expression of sigmoid function is $$sigmod(x) = \frac{1}{1 + e^{-x}}$$

and e represents a base of a natural logarithmic function; E1 and E2 represent randomly initialized node embeddings; $\Theta_1$ and $\Theta_2$ represent neural network model parameters; $\alpha$ represents a hyperparameter that controls a saturation rate of an activation function and is learned in a training process; A represents an adjacency matrix obtained after information aggregation based on nodes; $H_{t-1}$ represents an output hidden state of a previous iteration, and $H_t$ represents a hidden state, namely the representation vector of node, of current iteration;

continuously updating a composition of the graph by aggregating the node information, and thereby obtaining a global adjacency matrix of graph;

constructing the directed graph neural network model according to time periodic characteristics of meteorological data and the meteorological elements, wherein the meteorological elements comprise daily maximum temperature, precipitation, wind speed, air humidity, sunshine hours, and evapotranspiration; the directed graph neural network model aggregating information of input data through embedded a graph convolutional module and a temporal convolutional module, comprising:

a graph learning module adaptively extracting an adjacency matrix of graph from input time series data according to the stepwise learning strategy as input of subsequent node information aggregating process of the graph convolution module; wherein a sampling method only calculates the similarity score between pairs of nodes each time, and the similarity score between the pairs of nodes is taken as a hidden state and aggregated in each calculation process to obtain the global adjacency matrix of graph;

wherein the graph convolutional module is composed of two mixed propagation layers respectively processing inflow information and outflow information of each node, each of the two mixed propagation layers comprises an information propagation process and an information selection process, the information propagation process is configured to transmit node information based on a graph structure given by the adjacency matrix of graph, and the information selection process is configured to filter noise generated in the information propagation process;

wherein an attention mechanism is added in the information propagation process by that edges connecting nodes in the adjacency matrix of graph are given different weights according to a formula as follows:

$$H_t = \beta H_{t-1};$$

where $\beta$ represents the weight of each of the edges; $H_{t-1}$ represents the output hidden state of the previous iteration; $H_t$ represents the hidden state, namely the representation vector of node, of the current iteration;

step S3: training the directed graph neural network model after determining a loss function, obtaining a model satisfying requirements by adjusting a learning rate, an optimizer and regularization parameters as a forecast model, and saving the forecast model; and step S4: inputting historical multivariable time series into the forecast model, changing an output stride according to demands, and thereby obtaining high-temperature disaster forecast for a future period of time;

wherein the method further comprises:
   applying the high-temperature disaster forecast in providing support for decision-makings of meteorological departments and providing reference for people's daily activities.

2. The high-temperature disaster forecast method based on the directed graph neural network according to claim 1, wherein in the step S1, a process of constructing the multidimensional time series sample set according to the time periodic characteristics of the meteorological elements comprises:

setting $z_t \in R$, which represents values of multivariate variables at a time stride t, where R represents a real number; wherein $z_t[i] \in R$ represents a value of a variable i at the time stride t, and a historical sequence of multivariate data at a given time length of p is as follows:

$$X = \{z_{t_1}[i], z_{t_2}[i], \ldots, z_{t_p}[i]\};$$

wherein a label set is as follows:

$$Y = \{(y_{t1_1}, y_{t1_2}, y_{t1_3}, y_{t1_4}), (y_{t2_1}, y_{t2_2}, y_{t2_3}, y_{t2_4}), \ldots, (y_{tp_1}, y_{tp_2}, y_{tp_3}, y_{tp_4})\};$$

where, $y_{tg_1}, y_{tg_2}, y_{tg_3}, y_{tg_4}$ respectively represent a probability of the no high-temperature disaster, a probability of the high-temperature yellow early warning, a probability of the high-temperature orange early warning and a probability of the high-temperature red early warning at a time g; and g=1, 2, 3, . . . ,p.

3. The high-temperature disaster forecast method based on the directed graph neural network according to claim 1, wherein the temporal convolutional module is composed of four convolution kernels of different sizes and configured to extract time characteristics of data; in a process of extracting the time characteristics of data, a receptive field is controlled by setting sizes of the four convolution kernels; and a calculation formula of the receptive field is as follows:

$$rfsize = (out-1)*stride + ksize;$$

where out represents a size of receptive field of an upper layer; stride represents a moving stride of receptive field of current layer and has a default value of 1; and ksize represents a size of convolution kernel of the current layer.

4. The high-temperature disaster forecast method based on the directed graph neural network according to claim 1, wherein in the step S3, a cross entropy loss function is chosen as the loss function and an expression thereof is as follows:

$$l = \frac{1}{m} \sum_{k=1}^{m} G(y^{(k)}, y'^{(k)});$$

$$G(y^{(k)}, y'^{(k)}) = -\sum_{J=1}^{p} y^{(k)} \log y'^{(k)};$$

where m represents a total amount of data, p represents a classification number, k represents current input data, $y'^{(k)}$ represents a forecasted value, and $y^{(k)}$ represents an actual value.

5. A high-temperature disaster forecast method based on a directed graph neural network, comprising:

step S1: performing standardization processing on meteorological elements respectively to scale the meteorological elements into a same value range; according to high-temperature early warning levels, setting high-temperature disaster values to be 0, 1, 2 and 3 respectively representing no high-temperature disaster, a high-temperature yellow early warning, a high-temperature orange early warning and a high-temperature red early warning; and encoding the high-temperature disaster values introducing a model into a discrete value vector $(y_1, y_2, y_3, y_4)$ added into input data as a label;

constructing, according to time periodic characteristics of the meteorological elements, the meteorological elements obtained after performing the standardization processing into a multidimensional time series sample set based on a sliding window method; and according to a setting ratio, dividing the multidimensional time series sample set into a training set, a verification set and a testing set;

step S2: constructing a directed graph neural network model, wherein a process of constructing the directed graph neural network model comprises:

for the directed graph neural network model, building mutual driving relationships among variables based on a graph, taking the meteorological elements as nodes in the graph, and describing relationships among the nodes by an adjacency matrix of graph; then learning node information by a stepwise learning strategy and continuously updating a state of the adjacency matrix; wherein the stepwise learning strategy comprises: a graph learning layer, starting from an initial state, adding a node to the graph during each time of learning, then using a recurrent neural network to calculate, based on autoregressive of node information, a similarity score, and generating a connection relationship between the node as added and each original node;

the recurrent neural network processing initial information of node and decoding a representation vector of node into a hidden state as input of a next iteration, wherein node information is continuously aggregated during an iteration process, and the iteration process is as follows:

$$M_1 = \tan h(\alpha E_1 \Theta_1);$$

$$M_2 = \tan h(\alpha E_2 \Theta_2);$$

$$A = (\tan h(\alpha(M_1 M_2^T + M_2 M_1^T)));$$

$$H_t = \text{sigmod}(W \cdot x_t + U \cdot H_{t-1});$$

where, W and U are hyperparameters, x represents current input time series data; an expression of sigmoid function is $$\text{sigmod}(x) = \frac{1}{1+e^{-x}},$$

and e represents a base of a natural logarithmic function; E1 and E2 represent randomly initialized node embeddings; $\Theta_1$ and $\Theta_2$ represent neural network model parameters; $\alpha$ represents a hyperparameter that controls a saturation rate of an activation function and is learned in a training process; A represents an adjacency matrix obtained after information aggregation based on nodes; $H_{t-1}$ represents an output hidden state of a previous iteration, and $H_t$ represents a hidden state, namely the representation vector of node, of current iteration;

continuously updating a composition of the graph by aggregating the node information, and thereby obtaining a global adjacency matrix of graph;

constructing the directed graph neural network model according to time periodic characteristics of meteorological data and the meteorological elements, wherein the meteorological elements comprise daily maximum temperature, precipitation, wind speed, air humidity, sunshine hours, and evapotranspiration; the directed graph neural network model aggregating information of input data through embedded a graph convolutional module and a temporal convolutional module, comprising:

a graph learning module adaptively extracting an adjacency matrix of graph from input time series data according to the stepwise learning strategy as input of subsequent node information aggregating process of the graph convolution module; wherein a sampling method only calculates the similarity score between pairs of nodes each time, and the similarity score between the pairs of nodes is taken as a hidden state and aggregated in each calculation process to obtain the global adjacency matrix of graph;

wherein the graph convolutional module is composed of two mixed propagation layers respectively processing inflow information and outflow information of each node, each of the two mixed propagation layers comprises an information propagation process and an information selection process, the information propagation process is configured to transmit node information based on a graph structure given by the adjacency matrix of graph, and the information selection process is configured to filter noise generated in the information propagation process;

wherein an attention mechanism is added in the information propagation process by that edges connecting nodes in the adjacency matrix of graph are given different weights according to a formula as follows:

$$H_t = \beta H_{t-1};$$

where $\beta$ represents the weight of each of the edges; $H_{t-1}$ represents the output hidden state of the previous iteration; $H_t$ represents the hidden state, namely the representation vector of node, of the current iteration;

step S3: training the directed graph neural network model after determining a loss function, obtaining a model satisfying requirements by adjusting a learning rate, an optimizer and regularization parameters as a forecast model, and saving the forecast model;

step S4: inputting historical multivariable time series into the forecast model, changing an output stride according to demands, and thereby obtaining high-temperature disaster forecast for a future period of time; and step S5: issuing the high-temperature disaster forecast to meteorological departments, thereby performing, by the meteorological departments, decision-makings for dealing with high-temperature disaster according to the high-temperature disaster forecast; and issuing the high-temperature disaster forecast to the public, thereby adjusting, by the public, daily activities thereof.

* * * * *